(12) United States Patent
Fresolone

(10) Patent No.: US 8,872,011 B2
(45) Date of Patent: Oct. 28, 2014

(54) VISUAL, TACTILE AND MOTION-SENSATION SYSTEM FOR REPRESENTING MUSIC FOR AN AUDIENCE

(76) Inventor: Mark Fresolone, Lebanon, NJ (US)

( * ) Notice: Subject to any disclaimer, the term of this patent is extended or adjusted under 35 U.S.C. 154(b) by 222 days.

(21) Appl. No.: 13/405,000

(22) Filed: Feb. 24, 2012

(65) Prior Publication Data

US 2012/0216666 A1    Aug. 30, 2012

Related U.S. Application Data

(60) Provisional application No. 61/446,867, filed on Feb. 25, 2011.

(51) Int. Cl.
*G09B 15/02* (2006.01)
*G09B 21/00* (2006.01)

(52) U.S. Cl.
CPC .................................... *G09B 21/009* (2013.01)
USPC ...................................................... 84/483.2

(58) Field of Classification Search
USPC ...... 84/470 R, 471 R, 472–475, 471 SR, 476, 84/477 R, 478, 479 R, 480–482, 479 A, 84/483, 1, 2, 484, 485 SR, 485 R
See application file for complete search history.

(56) References Cited

U.S. PATENT DOCUMENTS

2008/0250914 A1*    10/2008    Reinhart et al. ................ 84/645

* cited by examiner

*Primary Examiner* — Kimberly Lockett
(74) *Attorney, Agent, or Firm* — Cohen & Hildebrand, PLLC

(57) ABSTRACT

System of translation between written or performed music and visual, tactile and motion sensation experiences. Specific metaphors for most aspects of music among these non-audio media are described. Examples include rules for color assignment to pitches in a scale; positioning visual representations of notes; visualizing notes between pitches; arranging tactile stimuli to represent pitches; and rendering stages of cadence with motion sensing experiences such as movement within space, or changes in one's tilt, pitch, etc. The system includes documentation of theoretical/interpretive elements such as key signature, current chord, association of notes with melody, as they occur in a piece, along with metaphors for their translation in these non-audible media. The metaphors are strictly prescribed, yet accommodating large variations and freedoms in visual, tactile and motion renderings by producers/artists, allowing for visual, tactile or motor metaphors for non-musical instrument sounds such as finger sliding across windings of a guitar string.

22 Claims, 5 Drawing Sheets

VISUAL, TACTILE AND MOTION-SENSATION SYSTEM FOR REPRESENTING MUSIC FOR AN AUDIENCE

BACKGROUND OF THE INVENTION

1. Field of the Invention

The present invention relates a system of rendering musical performances in non-traditional non-sound media specifically for an audience. The system is not a system of musical notation. The system has applications in the areas of art and entertainment, supplemental information for the profoundly hearing impared along the lines of video closed captioning, theme park amusement rides and aids to instruction in musical composition and theory.

2. Description of the Related Art

The assignment of colors to notes in musician's notation goes back more than 1000 years to the monasteries of France and Italy where Odo of Cluny first assigned a red line to indicate the note "F", and a yellow line above it to represent "C", according to Elson's Music Dictionary, by Louis C. Elson, 1905, Oliver Ditson Company, in recording sacred music.

There are some references which describe musical notation systems that allegedly "can be presented to an audience", and that provide a simple visual representation of notes played or displayed on specific electronic inventions.

SUMMARY OF THE INVENTION

The present invention described a system of rendering musical performances in non-traditional non-sound media specifically for an audience. The invention prescribes rules of rendering music in non-audible media, but in doing so, identifies no specific medium, device or even specific visual shapes with which to do so. However, the invention is not a system of musical notation. Notational systems target performers of musical instruments, who interpret the notation in order to create audio renditions for listeners on various instruments including human voice. This system does not target performers of musical instruments.

The proposed system consists of a set of rules for rendering written or performed music in a) visual, b) tactile and c) motor/movement/motion-sensation media, including pitch, note length/connectedness, loudness, volume, meter, harmonic relationships, harmonic sequence (e.g. cadence), distinct voices/performers, percussion and other aspects related to music as it is composed. The set of rules embody metaphors for the notational elements used in musical scores, as well as sound qualities that may be discovered from performed music including the pitches that lie between the notes of a scale, and documented theoretical or interpretive elements such as the current chord, the presence of individual stages of cadence, the inclusion of specific notes in themes or melodies, etc. The system is independent of the specific means by which it might be presented. A piece of music could be hand-draw by an artist one time interval at a time on subsequent pages, or presented as a live-action animation generated by graphical computer software and display systems. Systems that stimulate human motion sensation such as those found in amusement parks and flight simulators may be used to portray melodic, harmonic, cadence or percussive components of a musical piece. Tactile stimulation such as physical changes in the contours, vibration, temperature or other characteristics of a surface or object that is in contact with the body of an audience member could deliver metaphors for pitch, percussion, cadence and other musical qualities. The creator of a visual/tactile/motor musical rendering in this system is free to address sound qualities beyond those indicated by composed or written music. For example, qualities related to the playing of specific instruments (e.g. fingers sliding up and down wound guitar strings), vocal qualities (e.g. a singer with a hoarse voice), affects of electrical amplification (e.g. distortion) and unusual objects used in a piece (e.g. cannons in Tchaikovsky's 1812 Overture) may be rendered within this system in nearly any way conceived of by the artists/producers of the rendering, as long as those visualizations do not materially obscure the audience's ability to perceive the elements of the note-based visualizations prescribed here. For visual metaphors, a system of coloration is prescribed that is based on the common 12-note system of Western music represented, for example, by the 12 notes within an octave on a piano. Rules for the assignment of color to pitch are carefully prescribed to induce an innate sense in the audience member of which tones fall within a piece's key signature, and which tones fall outside of it. The coloration in this system is selected from specific intervals along the sequence or "continuum" of Hues in the subtractive or pigment style Red-Yellow-Blue (RYB) color wheel, and is described in terms of the Hue/Saturation/Lightness (aka Luminosity) model. The 12 notes or semitones are selected from among the 12 primary (3), secondary (3) and tertiary (6) colors in the color wheel. There are positional and coloration metaphors for visually representing pitches in-between the 12 notes such as an electric guitar vibrato/whammy bar, or a vocal flutter.

This system is generally applicable to non-12-note musical traditions such as those found in Asia and Africa, many referred to as microtonal. Most of this system's metaphors are directly applicable to microtonal music including visual positioning; the documentation and visual, motion and tactile representation of elements such as melodic phrasing and cadence; percussion and voicing. Certain elements, such as the 12-note based coloration assignments in this system may not be well suited to some of these traditions. More suitable assignments could be identified and integrated into this system. As an example, the 22 notes of the Shruti scale leveraged by historic Hindustani and Carnatic music could be mapped to colors leveraging the same continuum or sequence of Hues in the RYB color wheel as the system presented here. One might employ a more rudimentary mapping of colors than that used in the 12-note system in order to better accommodate the uneven intervals used in the scales of Indian music. For example, each incremental pitch in the historic Shruti scale (KKṣobhinī, obhinī, Tīvrā, Kumudvatī . . . ), which unlike the uniform intervals of the 12-note scale are separated by sequences of varying intervals of roughly 7.5%, 2% and 6% of an octave, could be assigned to a corresponding increment along the continuum of RYB Hues.

In conclusion, a system of translation is introduced which relates recognizable elements of written and performed music to visual, tactile and motion sensation media. The elements addressed include both those that are represented in musical notation, and those not represented in musical notation. The elements explicitly translated include pitch, notes within a chromatic scale, duration of a note, loudness or volume, pitches that lie between notes in a chromatic scale, pitches that are sampled at time intervals of fractions of a second and high resolution, harmonic key, non-musical sounds part of a musical piece or performance, voice or series of individual notes occurring simultaneously with other notes, percussion, sound qualities including timber, clarity, scratchiness and electronic distortion, thematic or melodic sequences of notes, notes with sequentially harmonic roles, stages of cadence, type of chord, major/minor status of a chord, notes within a chord, parts, phrases and dissonance. Through translation of the aforementioned elements, many other elements of music from among what may be argued as a nearly infinite array of constructs that individuals have and will in the future identify will be elucidated. A very few examples of such constructs are intervals, interval inversion, syncopation, grace notes (acciaccatura and the more ancient appoggiatura) and the practice of having different parts maintain a strict octave apart from each other over a phrase. Such elements are implicitly made recognizable by the visual, tactile and motor sensation renditions of the elements explicitly prescribed in this invention.

The elements identified for translation are related to visual representations in at least two axes in a two or three dimensional representation. Color assignments of notes in the chromatic scale of a musical piece are assigned to colors along specific intervals in the Hue parameter of the HSL model, loudness is related to the Saturation in the HSL model. Areas of coloration are used to relate notes within a chord to the type and tonic of the chord. Graphical techniques such as grouping, bracketing and the assignment of distinguishing markings are related to various melodic, arrangement and harmonic musical constructs. Broad freedom is given to an artist rendering music visually in representing percussion, within the limitations of grey-scale coloration, and other restrictions, non-musical sounds, and instrument and sound qualities. Similarly, tactile stimulus is related to pitch and grouping constructs in specific ways such as relative position within a group of linearly arranged stimuli, and distinctions among groups of stimuli, but many other constructs including type of chord, major/minor status, cadence related elements and voicing/parts are left for interpretation by an artist creating a rendering with broad freedom.

Other aspects of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
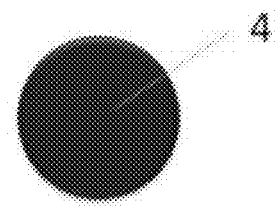
FIG. 1 illustrates an example of note visual colorization, and how various members of a major triad are represented.
Figure 1:
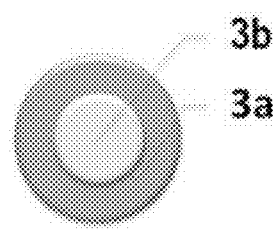
Figure 1:
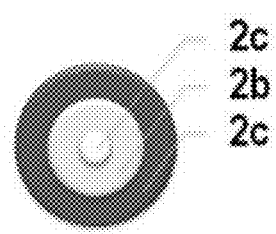
Figure 1:
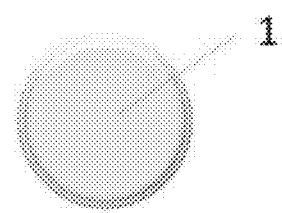
Figure 2:
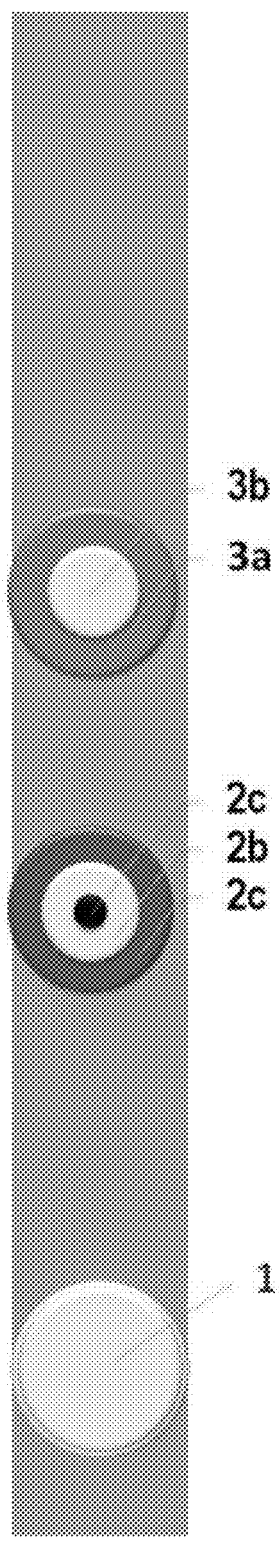
FIG. 2 illustrates a second example of note visual colorization, and how various members of a minor triad are represented.

FIGS. 1 and 2 show examples of note visual colorization, and how various members of a triad have are represented. Just about any shape, icon or image is allowed so long as it is reasonably self-contained (it can be distinguishes from elements around it.) Each note visualization should be composed up to three colors. These examples use the "circle" as the shape of quick notes.

In FIG. 1 the chord is the "I" chord for the current key, or the primary note in the chord matches the key note. 1 represents a triad "first" or tonic position. The shape is enhanced to indicate that it is the root of the current chord. There is one filling color, which is assigned to the pitch of the note. This color will always be the color of the primary note of the chord.

The triad "third" or median position is shown as 2 and represents a major chord. The outer circle 2a is the color assigned to the pitch of the note, the intermediate circle 2b is the color of the primary note of the chord, and the innermost circle 2c is the Major/Minor indicator. In this case, it is white, because it's a major third.

The triad "fifth" or dominant position is shown as 3. Here, the outer circle 3a is the color assigned to the pitch of the note, and the inner circle 3b is the color of the primary note of the chord.

Further, a non-chord note, which also happens to be an accidental with respect to the key signature, is shown as numeral 4. This non-chord note has one filling color, which is assigned to the pitch of the note. Because the non-chord note is accidental with respect to the key signature, that is, its pitch is not a member of the scale of the key signature, its color is from the portion of the RYB color wheel (5 notes ranging: Blue→Violet→Red) that is isolated from the portion used by the notes within the key signature (7 notes ranging: Blue-green→Yellow→Red-orange).

In FIG. 2, similar to the previous example, the chord is the "I" chord for the current key, that is, the primary note in the chord is the key note. The triad "first" position, shown as numeral 5, has a shape which is enhanced to indicate that it is the root of the current chord. There is one filling color, which is assigned to the pitch of the note. This will always be the color of the primary note of the chord.

The triad "third" position, shown as numeral 6 represents a Minor chord. The outer circle 6a is the color assigned to the pitch of the note, the intermediate circle 6b is the color of the primary note of the chord, and the innermost circle 6c is the Major/Minor indicator. In this case, it is black, because it's a minor third.

The triad "fifth" position is shown as numeral 7. The outer circle 7a is the color assigned to the pitch of the note, and the inner circle 7b is the color of the primary note of the chord. The background during this chord is grey, because it is a minor chord.

Figure 3:
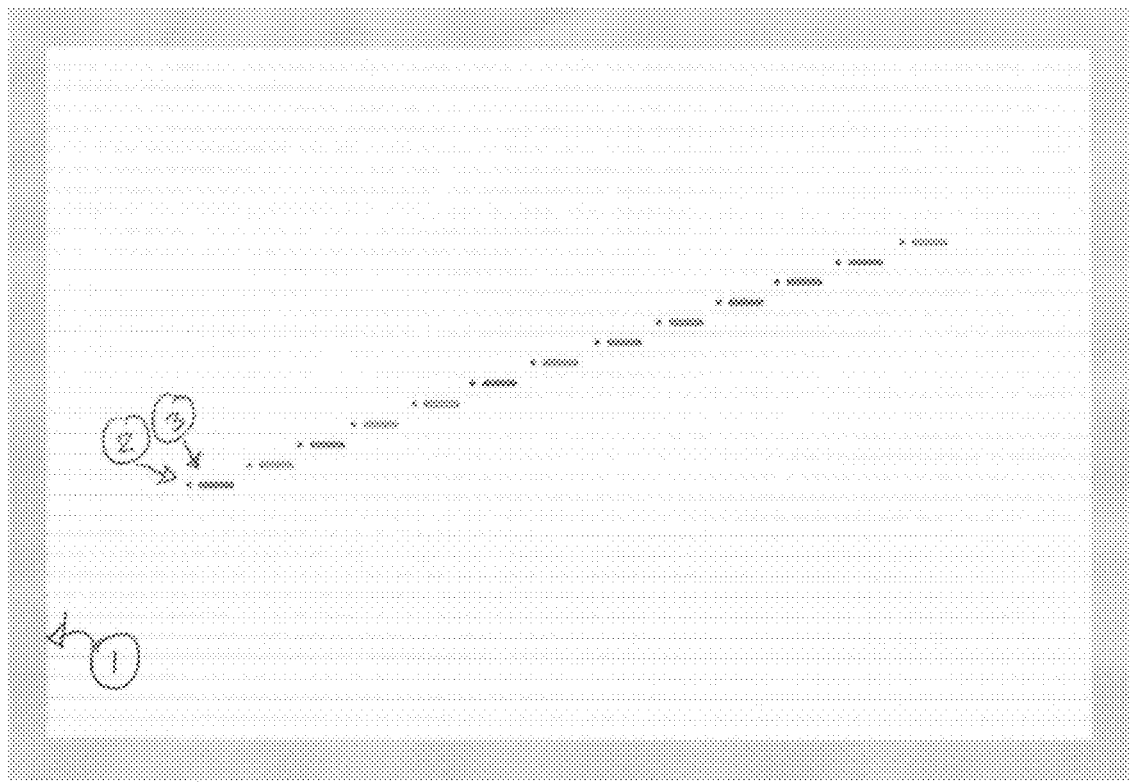
FIG. 3 illustrates a very simple segment of a piece of music.

FIG. 3 shows a sample segment of a piece of music that is very simple. It consists of a series of notes going up a chromatic scale, as in numerals 2 and 3, and has a brief note followed by a longer note for each member of the scale. The key of the selection, which is reflected in the color of the frame (yellow), numeral 1, is that of the fifth pitch in the sequence, representing the 9th and 10th notes that are played in the piece.

Figure 4:
FIG. 4 illustrates sample coloration, in hatched monochrome, of a 12-tone scale used in a subsequent visual example rendition.

FIG. 4 shows a sample coloration, in hatched monochrome, of a 12-tone scale used in a subsequent visual example rendition. In a real rendition, the various monochrome hatching patterns would be replaced by solid colors, per this invention.

Figure 5:
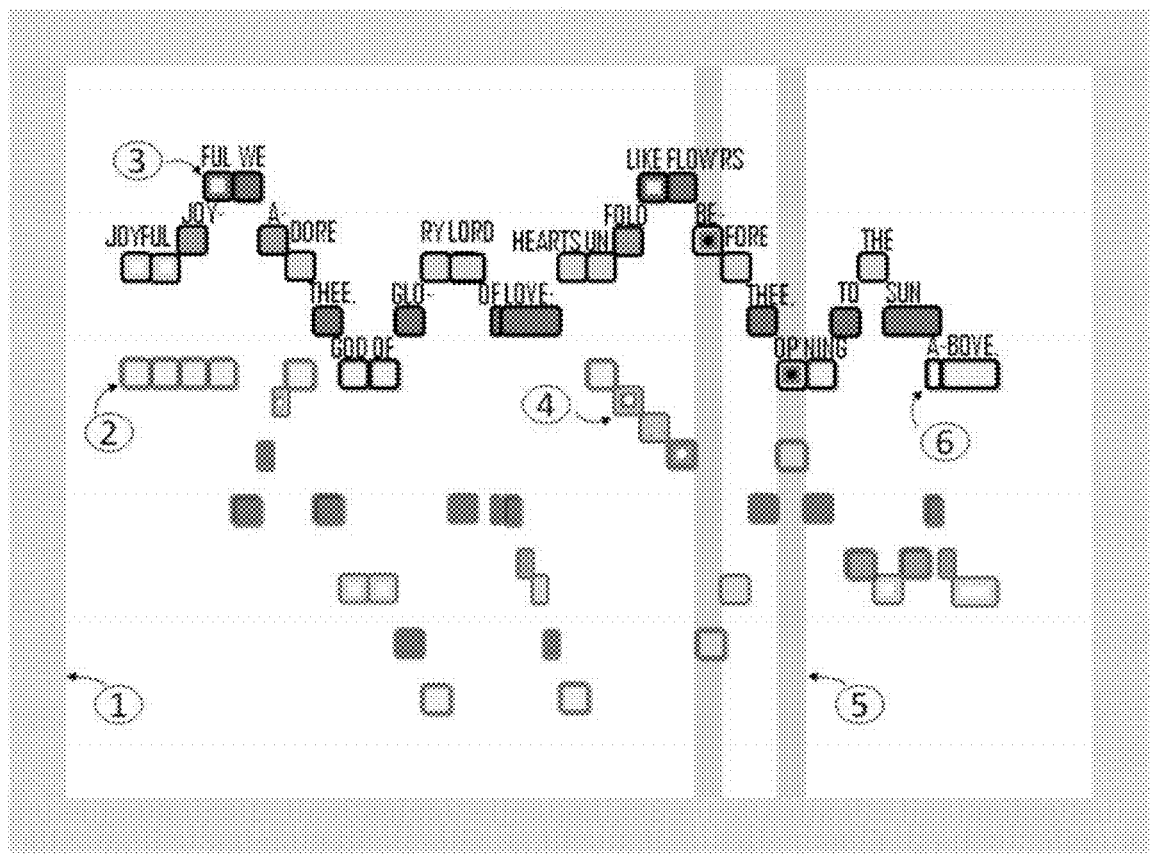
FIG. 5 illustrates a small, familiar musical fragment.

FIG. 5 shows a small, familiar musical fragment, that is, the first two phrases of Beethoven's Ode to Joy, with the words from the hymn, "Joyful, Joyful, We Adore Thee". It shows the identification of parts through dark or light outlines on each note, highlighting of the bass note, $3^{rd}$ and $5^{th}$ of each chord, dark shading for a minor chord, and a frame indicating the key. Numeral 1 is the frame. Numeral 2 is a highlighted tonic note ("first") of a chord, numeral 3 is a dominant note ("fifth") of a chord, numeral 4 is a median ("third") note of a chord, numeral 5 is a grayscale indicator of a minor chord, number 6 is an example of notes of short and long duration.

Thus, a system is provided which comprised of a set of rules for rendering written or performed music in visual, tactile and motion-sensation media, encompassing the majority of elements of the traditional musical score, as well as a set of harmonic elements. To aid in understanding the system, the elements of music that are addressed may be thought of as representing various narratives; a tonic narrative, a harmonic narrative and a melodic narrative. For elements of the tonic narrative, which generally represent all of the traditional "notes" that appear in a musical score or in sheet music (combining notes in the melody with those indicated by chords and harmonics), there are visual rules indicating allowable assignments of colors to the pitch of each note, described using the hue, saturation and lightness model as applied to red, yellow and blue primaries, including any pitches that may lie in between the notes of a scale. The visual rules for the tonic narrative do not prescribe the manner in which notes are represented, or any sorts of gaps, borders, blending or non-blending techniques, but it does require that there is a clear identification of the position each pitch has with respect to other pitches. For example, vertically higher notes have a higher frequency or pitch. Outside of the rule that the durations of notes be represented accurately in the horizontal axis, the color rule, and rules relating to loudness, there are few rules governing the presentation of notes.

For elements of the harmonic narrative, which generally represent concepts such as key, chord and the presence of sequential constructs such as cadence, there are visual, tactile and motion-sensing rules. The set of rules for the harmonic narrative are mostly concerned with the identification of specific harmonic structures that appear in a musical piece, and there are few rules indicating the visual, tactile or motion-sending metaphors for those structures. Many elements of a harmonic narrative are interpretive (e.g. is this a $Dm^7$, or D-minor-seventh or is it an $F^6$, or F-sixth), and the notion of a publication that records these elements independently of the visual/tactile/motion-sensing rendering of the music is a part of this system.

For elements of the melodic narrative, which generally represent related sequences of notes, there are rules for visual, tactile and motion metaphors.

A tonic rule for visualization indicating that all notes be presented in such a way that their pitch is easily observed in its relative vertical position with respect to the pitch of other notes, and that the various components of color—outer (pitch, the minimum requirement), inner (chord, if known) and core (major/minor, if known) are distinguishable.

A tonic rule for visualization indicating that the 12 notes of a Diatonic scale be assigned to Hues selected from the 12 primary, secondary and tertiary colors in the subtractive, or 'pigment' style color system of Red-Yellow-Blue, that for pieces in diatonic keys, all notes within the scale of the key signature be in the range of Hues beginning with the tertiary color adjacent to one of the primary colors (e.g. blue-green), through to the nearest adjacent primary (in this example, it would be yellow), and on up to the tertiary color adjacent to the third primary (in this example, it would be red-orange), with notes outside of the key signature assigned the colors from and including the first primary (e.g. blue), through to and including the third primary (e.g. red), including the two tertiary and one secondary between them, and that once assigned, the color of each pitch does not change for the duration of the piece, and that each specific Hue setting be allowed to vary within 5 or so percent from the official Hue figures for purposes of clarity and distinction in the context of the visual presentation.

A tonic rule for visualization indicating that the duration of notes be accurately portrayed in some manner to the viewer, for example through the length of a graphical object representing the note, or in an animated presentation, through the duration of time that a note appears.

A tonic rule for visualization indicating that the dynamics or audible "volume" of each note be represented through variations in the color Lightness or Luminosity level, with "barely audible" (e.g. ppp) being a value close to 1 (near white), and very loud (e.g. fff) being 0.5 (full color).

A tonic rule for visualization indicating that the Saturation of the pitch color of each note is by default to be 1 (full color Saturation) unless otherwise indicated by another rule, and that this mechanism be used to indicate the dynamics of attack and sustain.

A tonic rule for visualization indicating that notes representing pitches in-between two adjacent half-notes or semitones be assigned a color or pattern that is recognizably related to the two notes it is between, either by virtue of a Hue that is innately in between the two notes, or, especially if the colors are near or exact opposites (e.g. on opposite sides of the color/Hue wheel), by rendering a combination of the two pure semitone colors through a dithering/pattern technique.

A tonic rule for visualization indicating that for visual styles that represent notes in a way that allocates a graphical dimension to the passing of time, and in the case where the pitch of notes are sampled from performed music in intervals of minute fractions of a second, the representation of the pitch over time is "smoothed out" somewhat so that the constant state of 'jitter' that precise sampling instrumentation typically represents replaced by a sustained average pitch value over intervals where pitch is considered stable or a smooth curve where a pitch is, on average, steadily changing from one pitch to another in order to achieve a balance between accurately reflecting the intonation and pitch-related style of the performer, while at the same time maintaining a sense of sustained notes, veering or gently bouncing when a performer lilts or flutters, as perceived by a typical listener when hearing the original, sampled musical piece.

A tonic rule for visualization indicating that the current key of a piece be represented by a frame for the visual area that is rendered in the Hue of the key note/pitch, and that the current key only be considered to have "changed" if the potentially new key lasts continuously for a significant percentage of the piece, e.g. 35% of it, before returning to the original key, or if the piece never returns to the original key.

A tonic rule for visualization indicating that the sound of each type or unique sounding member of a type of percussion instruments may be indicated by any visual shape, graphic or object, and each may be placed in any area of the viewing surface, as long as the ability to place each sound in time as compared to notes is maintained; the volume of the percussive stroke be rendered in degrees of grey/black, where barely audible stroke is a very light grey, and the loudest stroke is a very dark grey or black; and qualities of the sound may be reflected in the visuals in any way desired, including delicate patterns for cymbals, solid or possibly fuzzy-edge objects for a bass drum; and tonic-oriented percussion instruments such as the timpani and kettle drums may be represented by either or both of notes, per tonic visualization rules, and percussion strokes, per this rule.

A tonic rule for visualization that notes that are known to represent different voices or parts, or in rendering approaches where there is no graphical dimension dedicated to the passing of time, instruments may be separated and grouped visually, for example as planes in a three dimensional space or side-by-side tiling of pitch sequence areas, and in such cases will be arranged in such a way as to ensure that the separation of notes into parts or instruments creates only a small probability of the viewer confusing differences in group membership with differences in pitch, and in cases of a small number of parts or instruments, may possibly be enhanced by allowing varying series of very small decreases in the Saturation of the colors indicated by other rules, and limiting any such decreased Saturations to a minimum of approximately 0.8.

A tonic rule for visualization indicating that the identity and/or timber related sound qualities of various voices, parts and instruments may be represented in the visual display of notes using any method that allows other visual components identified in other rules to be easily perceived, and which may be abstract or derived from real objects including iconographic, photographic or drawn images of the singer, instrument or assumed source of the part.

A tonic rule for visual, tactile and motion rendering indicating that specific sequences of notes may be identified and documented for the purpose of rendering through enhanced objects or experiences in one or more metaphors.

A harmonic rule indicating that for interpreted intervals of time, chords may be identified and documented for rendering through other rules, and that such intervals should when combined cover a significant portion of the piece.

A harmonic rule indicating that for interpreted intervals of time, a bass note may be identified and documented for rendering through other rules.

A harmonic rule indicating that leading notes, also known as leading tones, may be identified and documented for rendering through other rules.

A harmonic rule indicating that for interpreted intervals of time, a state of temporary key modulation may be identified and documented for rendering through other rules.

A harmonic rule indicating that cadences may be documented, and that those cadences should be expressed in successive, interpreted intervals of time, and with each interval identifying the type of cadence, which step, and the total number of steps for that cadence.

A harmonic rule indicating that an "authentic cadence", e.g. when a V chord is followed by the I chord, may be identified and documented, and a II(minor) or IV may be added to the steps, if preceding the V.

A harmonic rule indicating that a "weak cadence", e.g. when a I chord is followed at the end of a phrase or piece by a chord such as VI(minor), II(minor), III(minor) or other chord besides I, may be identified and documented.

A harmonic rule indicating that an "amen cadence", e.g. when a IV, or II(minor) chord is followed by a I chord, may be identified and documented. A harmonic rule indicating that a "flatted-sixth cadence", e.g. when the VI-⁻ is followed by the I, may be identified and documented.

A harmonic rule for visualization indicating that if a chord is identified, the elements of its triad, the first ("tonic"), third ("median") and fifth ("dominant") notes within the scale, be highlighted in the visualization in such a way that the primary note of the chord is enlarged or made prominent in some way, the "fifth" note of the chord combines an area with its own pitch color with a lesser area with the pitch color of the root of the chord, and the "third" note of the chord combines an area with its own pitch color, a lesser area with the pitch color of the root of the chord, and a central or surrounding/encircling area that is white if the chord is considered "major", and black if the chord is considered "minor".

A harmonic rule for visualization indicating that if the identified chord is considered a major chord, the background of the viewing area, not counting the frame, will be white, while if the chord is considered a minor chord, the background will be a shade of grey, typically, but not necessarily less than a "30%" shade.

A harmonic rule for visual, tactile and motion rendering indicating that when a note is identified as a bass note, it may be presented in such a way as to stand out through aspects or combinations of its representation in the various metaphors.

A harmonic rule for visualization indicating that cadence may be represented in an area of the display, separated from the pitch/note rendering area, but possibly embedded in a frame identifying key signature, that contains an animated or filmed object or objects representing harmonic changes and/or cadence, and that the objects can be, but need not be purely symbolic, and so could be represented by, as examples, a pair of dancers, a vehicle on contoured terrain, an animal such as a bird, or any visual device that is able to represent at least two unique states that the viewer can readily perceive as being temporary or involving "tension"; at least one state that the viewer can readily perceive as being "release" or a steady state; a way to represent a distinct color that is assigned to the primary pitch of the current chord; and one state that represents an altered context for the object or objects, allowing the other states to continue to each be clearly identified, and that may be used to represent temporary harmonic states such as certain chords, or key modulation when indicated.

A motion-sensation rule indicating that cadence may be represented as the real or perceived physical motion of the viewer in space or orientation with respect to "level", i.e. pitch and roll, so long as the various perceived motions and positions with respect to level are able to represent at least two unique states that the audience member can readily perceive as being temporary or involving "tension" such as moving or slightly rolling to the left and moving or slightly rolling to the right; at least one state that the audience member can readily perceive as being "release" or a steady state such as a return to level; and one state that allows for the other states to continue to each be clearly identified such as a sideways tilt, and that will be used to represent temporary key modulation when indicated.

A harmonic rule for motor sensation indicating that an audience member experience a transition in pitch or roll depending on the major/minor status of a chord, for example, pitched backward from level if the chord is considered "major", forward of level if the chord is considered "minor", and level if the major/minor status of the chord is not known.

A harmonic rule for tactile media indicating that in order to represent the bass notes, a surface containing a linear series of small, e.g. ¼ inch diameter, buttons that can be pushed outward from the surface perhaps ¼ inch or otherwise be made individually and temporarily conspicuous to the skin through temperature, micro-protrusions/surfacing, twisting, vibrating or other means, and containing at least 12 to 18 such buttons that represent sequenced notes of one to one and a half octaves or more, be used to reflect identified notes from a musical part or highlighted phrase when a part of the body, such as a calf, arm or part of the back, is pressed against the surface.

A tonic rule indicating that sets of sequential notes, which may overlap, and are considered to represent themes may be identified and documented for rendering through other rules.

A tonic rule indicating that multiple instruments or voices that may be present in a musical piece can be represented in visual, tactile or motion metaphors.

A tonic rule for tactile media indicating that in order to represent themes, a number of surfaces, each containing a linear series of small, e.g. ⅛ inch diameter, buttons that can be pushed outward from the surface perhaps ¼ inch or otherwise be made individually and temporarily conspicuous to the skin through temperature, micro-protrusions/re-surfacing or other means, and containing a quantity of such buttons that represent sequenced notes of as many octaves as needed, 12 per octave, be used to reflect identified themes when a part of the body, such as a calf, arm or part of the back, is pressed against the surface.

A rule for visual, tactile and motor media indicating that metaphors may be invented and employed by the artist/producer to represent sound qualities and audible events not related to musical notation or standard instruments such as huskiness in a voice, the "scratchiness" of a slow violin stroke, etc., and that such metaphors may only significantly obscure the clarity of other visual, tactile or motor metaphors if such obscuring is intended by the composer, or as in the case of extreme electrical amplifier distortion or orchestrated cannon fire, experienced by listening to a reference audio performance.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A system of translation for a range of recognizable elements of written and performed music, comprising at least one of notes, harmony, cadence, phrasing, theme, lyrics, dynamics, percussions, instrument quality and voice quality music to representational visual structures using in at least two axes, and at least one of representational patterns of tactile stimulation and representational patterns of physical stimulation creating a sense of motion.

2. The system of claim 1, wherein the elements include pitch, notes within a chromatic scale, duration of a note and elements based upon duration including time signature, rhythm, pedal, attack, sustain and tempo, loudness or volume and elements based up on, pitches that lie between notes in a chromatic scale, pitches that are sampled at time intervals of fractions of a second and high resolution, harmonic key, non-musical sounds part of a musical piece or performance, voice or set of individual notes occurring simultaneously, percussion, sound qualities including timber, clarity, scratchiness and electronic distortion, thematic or melodic sequences of notes, notes with sequentially harmonic roles, type of cadence including authentic, weak, amen and flatted-sixth cadences, stages of cadence, type of chord, major/minor status of a chord, notes within a chord, parts, phrases and dissonance.

3. The system of claim 2, wherein the system of translation relates pitch to a relative position in a visual vertical axis, and a relative position in a series of tactile stimulus and motion sensation.

4. The system of claim 2, wherein the system of translation relates notes within a chromatic scale to colors based on defined intervals to hue values in an HSL color model, and relative positions of tactile stimuli and motion sensation.

5. The system of claim 2, wherein the system of translation relates the duration of a note to relative length in the visual horizontal axis or if only vertical and depth axes are presented, a duration of time for which a visual representation of a note appears, and a duration of time in tactile stimulus and motion sensation.

6. The system of claim 2, wherein the system of translation relates loudness to visual color saturation in the HSL model, and intensity of tactile stimulus and motion sensation.

7. The system of claim 2, wherein the system of translation relates pitches that lie between notes in a chromatic scale to combinations of visual hue in the HSL model and relative position in a visual vertical axis, and relative positions of tactile stimulus and motion sensation.

8. The system of claim 2, wherein the system of translation relates pitches that are sampled at time intervals of fractions of a second and high resolution to interpretations as average pitch values of durations longer than the original sample frequency or computationally smoothed sequences of pitch value.

9. The system of claim 2, wherein the system of translation relates harmonic key to a framing region of a visual presentation surrounding an area in which notes are represented in at least one plane formed by the horizontal and vertical axes, voices or instruments are optionally represented by a placement of more than one note planes along the depth axis, with emphasized, comfortable tactile stimulus and with stable/level motion sensations.

10. The system of claim 2, wherein the system of translation relates non-musical sounds that are part of a musical piece or performance to visual graphical features and to tactile and motion sensation stimuli.

11. The system of claim 2, wherein the system of translation relates voice, part or instrument to a visual depth axis, to shapes and to groupings of tactile stimuli.

12. The system of claim 2, wherein the system of translation relates percussion to visual objects that are grey-scale and do not completely obscure the translations of other musical elements.

13. The system of claim 2, wherein the system of translation relates sound qualities including timber, clarity, scratchiness and electronic distortion to visual graphical features, and with tactile and motion sensation stimuli.

14. The system of claim 2, wherein the system of translation relates thematic or melodic sequences of notes to visual grouping and with tactile and motion sensation stimuli.

15. The system of claim 2, wherein the system of translation relates notes with sequentially harmonic roles to visual graphical features and to tactile and motion sensation stimuli.

16. The system of claim 2, wherein the system of translation relates defined types of harmonic sequence and cadence to visual graphical features and to tactile and motion sensation stimuli.

17. The system of claim 2, wherein the system of translation relates defined stages of harmonic sequence and cadence to visual graphical features and to tactile and motion sensation stimuli.

18. The system of claim 2, wherein the system of translation relates a type of chord with visual graphical features, and with tactile and motion sensation stimuli.

19. The system of claim 2, wherein the system of translation relates the major/minor status of a chord with visual graphical features that incorporate white for a major chord, grey-scale and black for a minor chord, and with tactile and motion sensation stimuli.

20. The system of claim 2, wherein the system of translation relates specific notes within a chord to visual highlighting of a chord's tonic note, incorporating an area with a chord's tonic color into a representation of a chord's median and dominant notes, and incorporating an area of white or black into a chord's representation of a median note, depending on the chord's major/minor status, respectively, if known, and with tactile and motion sensation stimuli.

21. The system of claim 2, wherein the system of translation relates phrases with visual features of grouping, and with tactile and motion sensation stimuli.

22. The system of claim 2, wherein the system of translation relates dissonance with visual graphical features, and with tactile and motion sensation stimuli.

\* \* \* \* \*